June 6, 1967  C. L. SCHREIBER  3,323,244
DISPLAY DEVICE
Filed April 9, 1964

INVENTOR
CHARLES L. SCHREIBER

BY *Sughrue, Rothwell, Mion and Zinn*
ATTORNEYS

3,323,244
DISPLAY DEVICE

Charles L. Schreiber, Corning, N.Y., assignor to Corning Glass Works, Corning, N.Y., a corporation of New York
Filed Apr. 9, 1964, Ser. No. 358,432
4 Claims. (Cl. 40—130)

The present invention relates to improvements in the art of display devices or signs, and more particularly to a unique dynamic display device utilizing the selectively variable light transmission property of phototropic glass.

There has long existed a need for a sign or display device capable of providing an infinitely variable message. Conventional displays are either static, animated, or variable. When the purpose of the display is advertising, static signs may become ineffective if the potential customer, after seeing the same message day after day, becomes immune to it. Animated displays of the blinking sign type also have limited appeal and may even become an annoyance to those in the vicinity. The few types of variable display devices in use today normally employ a motion picture projector and screen arrangement. As these devices require a relatively large area to operate in and are ineffective in poor weather, they have not fulfilled the need for a variable display device and consequently have not come into general usage.

Accordingly, it is the object of this invention to provide a simple, rugged, and inexpensive dynamic display device. More specifically, it is an object of this invention to provide such a display device employing a sheet of material the visible light transmission of which may be varied by means of electromagnetic radiation focused upon the material.

Other objects of the invention will be pointed out in the following description and claims and illustrated in the accompanying drawings, which disclose, by way of example, the principle of the invention and the best mode which has been contemplated of applying that principle.

This invention employs a sheet of phototropic or photochromic glass through which the transmission of visible light may be varied by projecting onto the phototropic or photochromic glass another wave length from the electromagnetic spectrum. Phototropic or photochromic glass is an inorganic silicate glass the optical transmittance of which varies reversibly with the intensity of a particular electromagnetic radiation incident thereon. A type of phototropic glass which may be used in this device is more fully disclosed in copending application Ser. No. 213,634, filed July 31, 1962, by William H. Armistead and Stanley D. Stookey, now Patent 3,208,860 issued Sept. 28, 1965. The phototropic glass disclosed in that application is an inorganic silicate glass containing a small concentration of inorganic crystals which become darker in color upon exposure to actinic radiation of wave lengths between 0.3 and 0.5 micron. The visible light transmission of these glasses decreases when exposed to the actinic radiation. With the removal of the actinic radiation from the glass, the visible light transmission of the glass is restored. It is also within the scope of the present invention to employ phototropic glasses other than those discussed in the Armistead and Stookey application. The devisive criteria in choosing the glass to be employed in the display device is that the optical transmittance of visible light of the glass be variable with the intensity of electromagnetic radiation incident on the glass and be quickly restored when the electromagnetic radiation is removed.

Phototropic glasses are heat sensitive, in that the visible light transmission can be restored by heating the glass. As mentioned above, however, the visible light transmission is restored in the absence of heat, but heating will speed up this phenomenon.

In this display device, the phototropic glass is suitably supported and an inexpensive source of constant illumination is employed to shine visible light upon the surface of the phototropic glass. An image projecting arrangement projects a full picture graphic image of electromagnetic radiation having a selected wavelength onto the phototropic glass and this electromagnetic radiation decreases the transmission of visible light through the phototropic glass so as to present a contrast when the surface of the phototropic glass is viewed. That is, the illumination provided by the inexpensive light source will be visible only where the phototropic glass does not have the projected image of selected wavelength which has reduced the light transmission of the phototropic glass and rendered it opaque.

Figure 1:
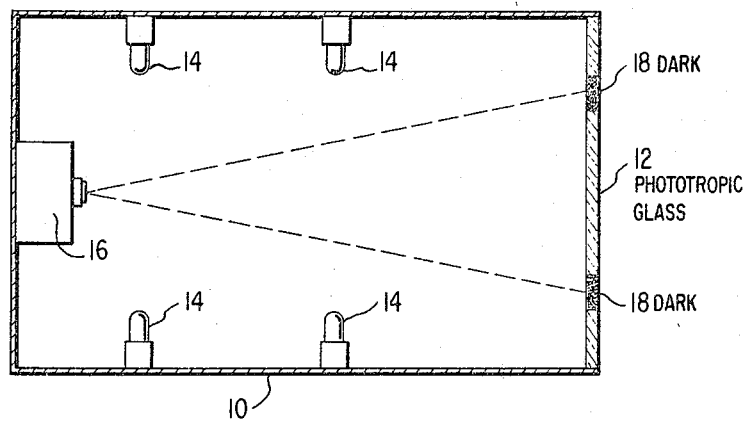
FIGURE 1 is a somewhat schematic cross-sectional view of the device of this invention.
Figure 2:
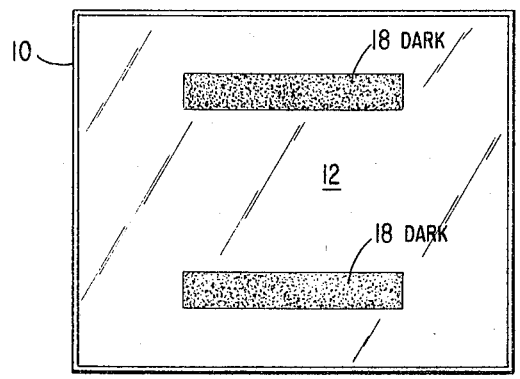
FIGURE 2 is a front view of the display device showing portions of the viewing face selectively opaque.

Referring to FIGURE 1, there is shown an enclosed housing or other suitable support 10 which includes a sheet of phototropic glass 12 on one face thereof and which may also contain the other elements of the display device. The phototropic glass may be of the type disclosed in the aforesaid application or any other suitable type. A source of illumination 14 is provided to generally, uniformly, illuminate the back surface of the phototropic glass 12 with visible light. Any commonly available incandescent or fluorescent lighting may be used for this purpose. As shown in the drawing, a plurality of the light sources 14 may be employed. A source of electromagnetic radiation of phototropic glass activating wavelength is projected from projector 16 to focus a full picture graphic representation defined by the electromagnetic radiation of selected wavelength upon the surface of the phototropic glass. The projector 16 may use a mask or film to define the projected image. The wavelength of electromagnetic radiation chosen to be projected depends upon the specific phototropic glass used. For example, radiation having a wavelength of from about 0.3 micron to 0.5 micron would be employed, these wavelengths being in the ultraviolet and blue portions of the spectrum, when they are effective in lowering the visible light transmission of the phototropic glass, such as the phototropic glass of the aforesaid application.

In the operation of the device, the image projecting member 16 casts a graphic image upon the back surface of the phototropic glass. The portions 18 of the phototropic glass struck by this radiation are thereby rendered opaque to visible light. The visible light emanating from source 14 will not pass through opaque areas 18 of the phototropic glass. Thus, a person viewing the face of the phototropic glass will see an image defined by the electromagnetic radiation projected onto the phototropic glass 12.

When the electromagnetic image from source 16 is no longer projected upon the phototropic glass, the entire surface of the phototropic glass will transmit visible light which effectively results in an erasure of the image. Thus, by interrupting the image coming from the source of electromagnetic radiation a mesasge may be continuously flashed onto the phototropic glass. Alternatively, by casting different images upon the back surface of the phototropic glass in series by means of a movie type projector a dynamic display can be made.

It is within the scope of the subject invention to employ as the image projecting element any member capable of casting images defined by electromagnetic radiation onto the back surface of the phototropic glass, with devices capable of projecting a simultaneous full picture graphic image being preferred. A servo system may be employed. Another method of doing this might be to employ materials which absorb or transmit the electromagnetic radiation of a selected wavelength. Thus, for example, if the electromagnetic radiation is ultraviolet light, the mask might have a background made of an ultraviolet light absorbing material while the image defining area would be of a material transmitting ultraviolet light. Hence, although the entire back surface of the mask would be illuminated by the ultraviolet light the ultraviolet light would only pass through the image defining area.

It is also possible to employ a thin beam of electromagnetic radiation, such as a pencil beam of ultraviolet light, to define the image. By using a servo remote control and writing the message periodically, it is possible to maintain the image on the glass.

Figure 3:
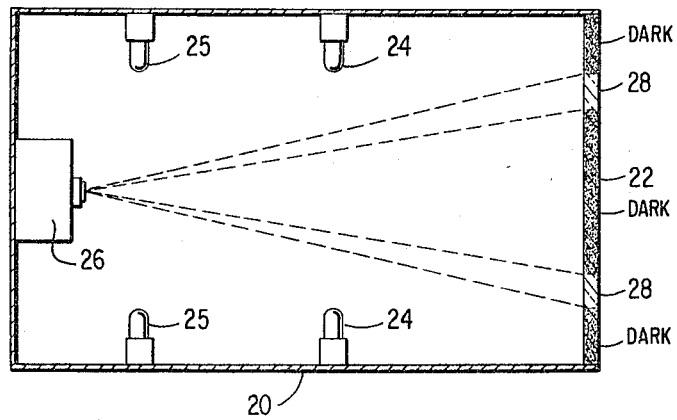
FIGURE 3 is a somewhat schematic cross-sectional view of a modification of the device of this invention.

A modification of the subject device is shown in FIGURE 3. In this modification, the back surface of a sheet of phototropic glass 22 is illuminated with visible light from sources 24. In addition, the back surface of the phototropic glass 22 is fully illuminated with electromagnetic radiation of phototropic glass activating wavelength from sources 25. This effectively renders the phototropic glass 22 opaque to visible light. An image defined by heat rays is projected from source 26 onto the back surface of phototropic glass 22. Those portions of the phototropic glass 22 struck by the heat rays will transmit visible light, since the heat reverses the phenomenon caused by the electromagnetic radiation of phototropic glass activating wavelength. The visible light transmitting portions 28 of the phototropic glass 22 will present an image to one viewing the display device. The image is defined by the electromagnetic radiation of phototropic glass activating wavelength.

Although a plurality of sources of visible light and electromagnetic radiation of phototropic glass activating wavelength have been shown, this is not necessary. Any means capable of fully illuminating the phototropic glass may be employed.

Any means capable of projecting an image defined by heat rays may be used as the projector 26. Thus, a movie type projector having an infrared bulb may be employed. Any of the projectors disclosed above as capable of projecting the electromagnetic radiation of phototropic glass activating wavelength can be used for projecting the heat image, by modifying them to cast an image defined by heat energy.

If it is wished, the front or viewing surface of the phototropic glass may be coated with a light diffusing means. This will prevent one who viewed the front of the phototropic glass from clearly seeing inside of housing 10 of the display device. Alternatively, this coating may be omitted and a suitable scene employed behind the transparent phototropic glass. This scene can be used to disguise the electromagnetic radiation projector and the sources of visible light.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:
1. An illuminated display device comprising:
    (1) a plate of phototropic glass having the characteristic of visible light transmission variation upon being excited with electromagnetic radiation of a predetermined wavelength band;
    (2) means for supporting said phototropic glass;
    (3) means for generally illuminating said phototropic glass with visible light located behind said plate of phototropic glass;
    (4) means for selectively projecting a graphic image defined by electromagnetic radiation in said predetermined wavelength band in the form of the desired display upon the phototropic glass to thereby vary the transmission of the visible light provided by the illuminating means and accordingly providing a display of the projected graphic image.

2. The illuminated display device of claim 1 wherein said means (4) projects a graphic image defined by heat energy and means are provided for fully illuminating said plate of phototropic glass with electromagnetic radiation in said predetermined wavelength band.

3. The illuminated display device of claim 1 wherein said electromagnetic radiation is of a wavelength of 0.3 to 0.5 micron and the phototropic glass is of the type rendered opaque by the application of this wavelength.

4. The illuminated display device of claim 1 wherein said means (4) is adapted to project a simultaneous full picture graphic presentation.

References Cited

UNITED STATES PATENTS

| | | | |
|---|---|---|---|
| 3,064,134 | 11/1962 | Kell | 88—106 |
| 3,085,469 | 4/1963 | Carlson | 88—106 X |
| 3,105,761 | 10/1963 | Foris | 88—106 X |
| 3,134,297 | 5/1964 | Carlson | 88—106 X |
| 3,134,674 | 5/1964 | Brown | 96—69 X |
| 3,158,678 | 11/1964 | Anderson | 88—106 X |
| 3,225,470 | 12/1965 | Schwab | 88—106 |
| 3,236,651 | 2/1966 | Marks | 96—90 X |

FOREIGN PATENTS 649,852  10/1962  Canada.

OTHER REFERENCES

"Popular Science," February 1964, pp. 84, 85, 86 and 190, title of article "Instant Sunglasses."

LAWRENCE CHARLES, *Primary Examiner.*

EUGENE R. CAPOZIO, H. F. ROSS, *Examiners.*